US012612087B2

(12) United States Patent
Bjurström

(10) Patent No.: US 12,612,087 B2
(45) Date of Patent: Apr. 28, 2026

(54) SENSOR SYSTEMS AND METHODS FOR MONITORING ENVIRONMENTAL VARIABLES OF A RAIL-BOUND VEHICLE

(71) Applicant: ICOMERA AB, Gothenburg (SE)

(72) Inventor: Joel Bjurström, Gothenburg (SE)

(73) Assignee: Icomera AB, Gothenburg (SE)

( * ) Notice: Subject to any disclaimer, the term of this patent is extended or adjusted under 35 U.S.C. 154(b) by 747 days.

(21) Appl. No.: 16/834,268

(22) Filed: Mar. 30, 2020

(65) Prior Publication Data

US 2020/0317238 A1     Oct. 8, 2020

(30) Foreign Application Priority Data

Apr. 4, 2019     (SE) ...................................... 1950418-2

(51) Int. Cl.
B61L 15/00          (2006.01)
B61C 17/12          (2006.01)

(52) U.S. Cl.
CPC ....... B61L 15/0081 (2013.01); B61L 15/0063 (2013.01); B61L 15/0072 (2013.01); B60L 2200/26 (2013.01); B61C 17/12 (2013.01)

(58) Field of Classification Search
CPC ....... B61L 15/0081; B61L 15/63; B61L 15/72
See application file for complete search history.

(56) References Cited

U.S. PATENT DOCUMENTS

| | | | |
|---|---|---|---|
| 6,539,293 B2 | 3/2003 | Bachtiger et al. | |
| 2009/0001226 A1* | 1/2009 | Haygood ................. | G01H 1/06 |
| | | | 701/19 |

| | | | |
|---|---|---|---|
| 2013/0073139 A1* | 3/2013 | Henry ..................... | B61C 17/12 |
| | | | 701/29.3 |
| 2013/0317676 A1 | 11/2013 | Cooper | |
| 2014/0129154 A1 | 5/2014 | Cooper | |
| 2015/0081214 A1* | 3/2015 | Cooper ................. | B61L 23/042 |
| | | | 701/523 |

(Continued)

FOREIGN PATENT DOCUMENTS

| | | |
|---|---|---|
| EP | 1213202 | 6/2002 |
| GB | 2516663 A | 2/2015 |

(Continued)

OTHER PUBLICATIONS

European Search Report dated Sep. 24, 2020 received in European Patent application No. 20164543.9.

(Continued)

*Primary Examiner* — Imran K Mustafa
(74) *Attorney, Agent, or Firm* — AVEK IP, LLC

(57)          ABSTRACT

Sensor systems and methods for measuring environmental parameters associated with a rail-bound vehicle having a plurality of carriages are disclosed. In an embodiment, the sensor system includes a plurality of sensors arranged in a separate carriage of the rail-bound vehicle at a defined distance from a reference point within the rail-bound vehicle. The sensor system further includes a control unit configured to receive measurement signals and time-shift the received measurement signals based on the defined distance and a velocity of the rail-bound vehicle to determine whether an event measured by the plurality of sensors is present at the same point in time in two or more signals of a modified (time-shifted) set of signals.

17 Claims, 3 Drawing Sheets

(56)          References Cited

U.S. PATENT DOCUMENTS

| | | | |
|---|---|---|---|
| 2017/0267263 A1 | 9/2017 | Pinto et al. | |
| 2018/0319414 A1* | 11/2018 | Lefebvre | B61L 25/028 |
| 2019/0319835 A1* | 10/2019 | Mansfield | H04L 43/08 |
| 2021/0097315 A1* | 4/2021 | Carruthers | G08B 13/19645 |

FOREIGN PATENT DOCUMENTS

| | | | |
|---|---|---|---|
| WO | 2015/042223 A1 | 3/2015 | |
| WO | 2017/093741 A1 | 6/2017 | |

OTHER PUBLICATIONS

Swedish Application No. 1950418-2, Search Report dated Oct. 29, 2019, 33 pages.

* cited by examiner

SENSOR SYSTEMS AND METHODS FOR MONITORING ENVIRONMENTAL VARIABLES OF A RAIL-BOUND VEHICLE

CROSS REFERENCE TO RELATED APPLICATIONS

This application claims priority to Swedish application number 1950418-2, filed on Apr. 4, 2019, the disclosure of which is incorporated by reference herein in its entirety.

FIELD OF THE DISCLOSURE

The disclosure relates generally to sensor systems for rail-bound vehicles and methods thereof. More specifically, the disclosure relates to systems and methods for fusing sensor data from multiple carriages of rail-bound vehicles.

BACKGROUND

The present and growing abundance of inexpensive, highly integrated electronic sensors along with improvements in data processing and refinement has driven a development of increased monitoring of many variables not previously considered interesting, often with tangible positive economic implications.

For example, vibration monitoring and analysis in industrial machinery, using inexpensive electronic accelerometers, enables the concept of Condition Based Maintenance (CBM) in which the health of an individual mechanical component can be determined to some accuracy. This allows for the detection of approaching mechanical issues before a breakdown occurs. Moreover, it allows for prolongation of maintenance intervals, where components previously had been serviced or replaced unnecessarily early to ensure reliability. Accordingly, the advantages are two-fold since unwarranted maintenance as well as unforeseen disturbances are avoided.

Condition monitoring of railway tracks is not only essential in ensuring the safety of railways but also for keeping control of track quality to increase rail operation revenues. In the railway industry, specialized track geometry vehicles typically measure the condition of railway tracks. However, for reasons of cost and practicality, such measurements are infrequently performed. Further, excluding drainage and substructure, track geometry deteriorates primarily due to the influence of dynamic loads exerted by rail-bound vehicles. However, such dynamic loads cause deterioration of all track elements: rails, wooden sleepers, concrete sleepers, fastenings, substructure, and railway geometry.

To this end, conventional track monitoring systems make use of no-contact opto-electronic technologies or inertial techniques, instead of traditional "contact" track measuring systems which use mechanical devices in contact with rails and are accordingly more prone to wear and eventual deterioration in terms of accuracy. Thus, "contact" systems require regular monitoring, calibration, repair, or replacement. However, conventional systems relying on inertial techniques often experience problems when measuring at low speeds and with rapid accelerations/decelerations, while opto-electronic technologies are oftentimes complex and costly.

Thus, there is a need for new and improved methods and systems for monitoring or measuring environmental parameters of rail-bound vehicles to monitor the condition of a railway track or add redundancy to conventional geolocation systems, et cetera. In more detail, there is a need for a method and system which are cost effective and less complex than presently known solutions. In other words, there is a need for methods and systems for monitoring environmental variables of rail-bound vehicles which is simple, cost-effective, and reliable.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a sensor system for a rail-bound vehicle having a plurality of carriages. The sensor system includes a plurality of sensors, a velocity measurement device, and a control unit. Each one of the plurality of sensors is arranged in a separate carriage of the rail-bound vehicle at a defined distance from a reference point within the rail-bound vehicle. Each one of the plurality of sensors is configured to generate a measurement signal based on a detection of an environmental parameter. The velocity measurement device is configured to determine a velocity of the rail-bound vehicle. The control unit configured to receive the measurement signal from each one of the plurality of sensors; time-shift the measurement signals based on the velocity of the rail-bound vehicle and the defined distance to form a modified set of signals, such that a measurement made by each one of the plurality of sensors at a same geographical location appears to have occurred simultaneously; and determine whether an event measured by the plurality of sensors is present at a same point in time in at least two signals of the modified set of signals.

Optionally, the plurality of sensors includes a plurality of accelerometers. Each one of the plurality of accelerometers is arranged in a separate carriage of the rail-bound vehicle at a defined distance from the reference point within the rail-bound vehicle. Each one of the plurality of accelerometers is configured to generate a vibration detection signal based on a detection of vibration of an associated carriage. The control unit is configured to receive the vibration detection signal; time-shift the vibration detection signals based on the velocity of the rail-bound vehicle and the defined distance between the accelerometers and the reference point to form a modified set of vibration detection signals, such that a measurement made by each accelerometer at a same geographical location appears to have occurred simultaneously; and determine whether an event measured by the plurality of accelerometers is present at a same point in time in at least two signals of the modified set of vibration detection signals.

Optionally, the plurality of sensors further includes a plurality of acoustic sensors. Each one of the plurality of acoustic sensors is arranged in a separate carriage of the rail-bound vehicle at a defined distance from the reference point within the rail-bound vehicle. Each one of the plurality of acoustic sensors is configured to generate a sound detection signal based on sound measurements in an associated carriage. The control unit is further configured to receive the sound detection signal; time-shift the sound detection signals based on the velocity of the rail-bound vehicle and the defined distance between the acoustic sensors and the reference point to form a modified set of sound detection signals, such that a measurement made by each acoustic sensor at a same geographical location appears to have occurred simultaneously; and determine whether an event measured by the plurality of acoustic sensors is present at a same point in time in at least two signals of the modified set of sound detection signals.

Optionally, the plurality of sensors further includes a plurality of light sensors. Each one of the plurality of light sensors is arranged in a separate carriage of the rail-bound vehicle at a defined distance from the reference point within the rail-bound vehicle. Each one of the plurality of light sensors is configured to generate a light detection signal based on light measurements in an associated carriage. The control unit is further configured to receive the light detection signal; time-shift the light detection signals based on the velocity of the rail-bound vehicle and the defined distance between the light sensors and the reference point to form a modified set of light detection signals, such that a measurement made by each light sensor at a same geographical location appears to have occurred simultaneously; and determine whether an event measured by the plurality of light sensors is present at a same point in time in at least two signals of the modified set of light detection signals.

Optionally, the sensor system further includes a geolocation system. The geolocation system is arranged in the rail-bound vehicle for determining a geographical position of the rail-bound vehicle. The control unit is configured to receive the geographical position from the geolocation system and determine a geographical location of the event based on the geographical position.

Optionally, the control unit is further configured to correlate the modified set of light detection signals with the geographical position to add redundancy to measurements performed by the geolocation system.

Optionally, the sensor system further includes a lighting device arranged in each carriage which includes a light sensor. Each lighting device is operatively connected to the control unit. The control unit is further configured to control each lighting device based on the modified set of light detection signals.

Optionally, the plurality of sensors further includes a plurality of air pressure sensors. Each one of the plurality of air pressure sensors is arranged in a separate carriage of the rail-bound vehicle at a defined distance from the reference point within the rail-bound vehicle. Each one of the plurality of air pressure sensors is configured to generate an air pressure detection signal based on air pressure measurements in an associated carriage. The control unit is further configured to receive the air pressure detection signal; time-shift the air pressure detection signals based on the velocity of the rail-bound vehicle and the defined distance between the air pressure sensors and the reference point to form a modified set of air pressure detection signals, such that a measurement made by each air pressure sensor at a same geographical location appears to have occurred simultaneously; and determine whether an event measured by the plurality of air pressure sensors is present at a same point in time in at least two signals of the modified set of air pressure detection signals.

Optionally, the sensor system further includes a geolocation system. The geolocation system is arranged in the rail-bound vehicle for determining a geographical position of the rail-bound vehicle. The control unit is configured to receive the geographical position from the geolocation system and determine a geographical location of the event based on the geographical position.

Optionally, the control unit is further configured to correlate the modified set of air pressure detection signals with the geographical position to add redundancy to measurements performed by the geolocation system.

Optionally, the sensor system further includes a lighting device arranged in each carriage which includes an air pressure sensor. Each lighting device is operatively connected to the control unit. The control unit is further configured to control each lighting device based on the modified set of air pressure detection signals.

In other embodiments, the disclosure provides a method for measuring environmental parameters associated with a rail-bound vehicle having a plurality of carriages. The method includes the following steps. Determining a velocity of the rail-bound vehicle. Measuring an environmental parameter independently in each one of the plurality of carriages to form a plurality of measurement readings over time. Each measurement is performed at a defined distance from a reference point within the rail-bound vehicle. Time-shifting the measurement readings based on the velocity of the rail-bound vehicle and the defined distance to form a modified set of measurement readings, such that a measurement made in each carriage at a same geographical location appears to have occurred simultaneously. Determining whether an event measured in each separate carriage is present at a same point in time in at least two readings of the modified set of measurement readings.

Optionally, the environmental parameter is vibration, sound, light, or air pressure.

Optionally, the method further includes determining a geographical position of the rail-bound vehicle.

Optionally, the method further includes the following steps. Determining a geographical position of the rail-bound vehicle. Correlating the geographical position of the rail-bound vehicle with the modified set of measurement readings. The environmental parameter is light.

Optionally, the method further includes the following steps. Determining a geographical position of the rail-bound vehicle. Correlating the geographical position of the rail-bound vehicle with the modified set of measurement readings. The environmental parameter is air pressure.

BRIEF DESCRIPTION OF THE DRAWINGS

Illustrative embodiments of the disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
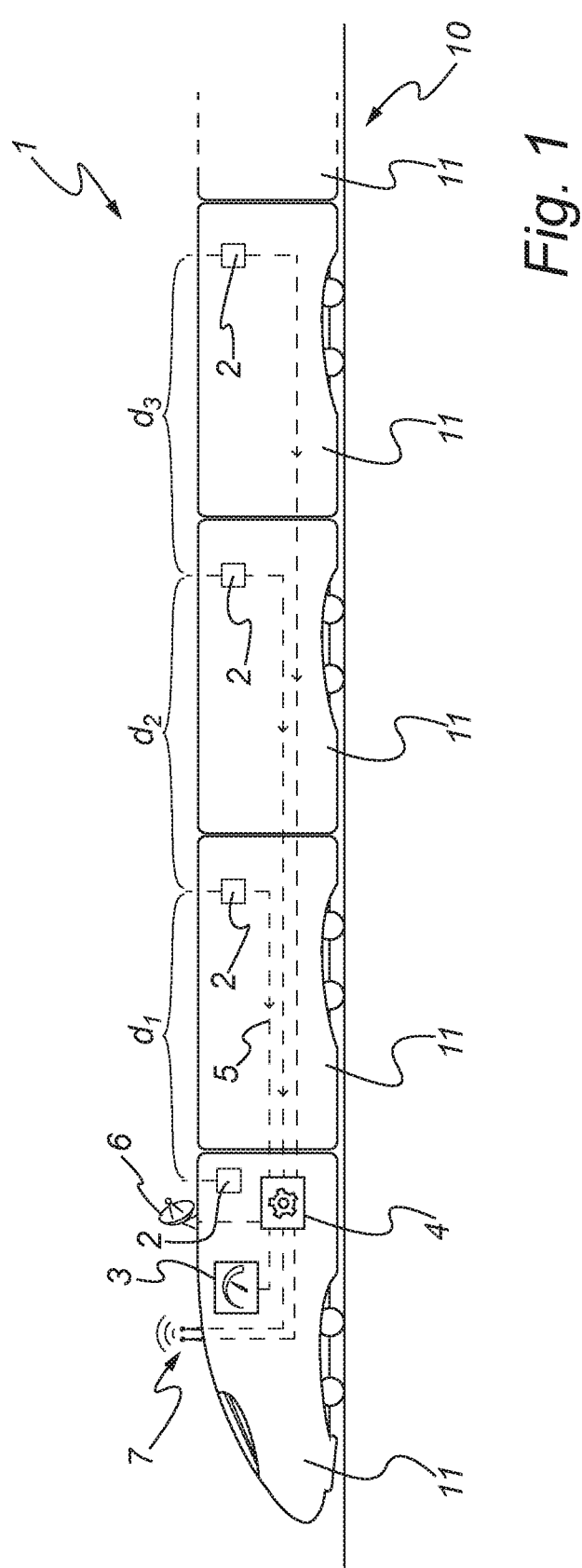
FIG. 1 is a schematic illustration of a rail-bound vehicle having a sensor system according to an embodiment of the disclosure.

FIG. 1 is a schematic illustration of a rail-bound vehicle 10, such as a train, having a sensor system 1 according to an embodiment of the disclosure. The sensor system 1 may include a plurality of sensors 2. Each sensor 2 may be arranged in a separate carriage 11 of the rail-bound vehicle 10 at a defined distance from a reference point. In the illustrated embodiments, each sensor 2 may be arranged at a defined distance d1, d2, d3 from each other. Thus, any one of the illustrated sensors 2 may be construed as the reference point. Moreover, each sensor 2 may be configured to generate a measurement signal based on detection of an environmental parameter (e.g. acceleration, sound, light, air pressure, et cetera). Thus, the sensors 2 may, for example, be accelerometers, acoustic sensors, light sensors, and/or air pressure sensors.

Further, the sensor system 1 may include a velocity measurement device 3 (e.g. GPS, wheel tick counter, or any other conventional speedometer) configured to determine a velocity of the rail-bound vehicle 10. The sensor system 1 may also include a control unit 4 connected to the velocity measurement device 3, and each sensor 2. A skilled artisan would readily understand that the various components (control unit, sensors, velocity measurement device, et cetera) do not have to be physically connected to each other, but may be connected by wireless means as known in the art. The rail-bound vehicle may have a communication system with one or more data communication routers to which the different components are connected to transmit data via an internal local area network (LAN). The control unit 4 may be implemented as a software controlled processor. However, the controller may alternatively be implemented wholly or partly in hardware. Moreover, even though the control unit 4 is illustrated as a local control unit 4 arranged within the rail-bound vehicle, in alternate embodiments it may be a remote unit arranged external to the rail-bound vehicle 10. It may be a central control unit (30 in FIG. 2) operatively connected to a plurality of such rail-bound vehicles 10, and may receive and process sensor data from each of these vehicles. In such cases, each rail-bound vehicle 10 may accordingly be provided with suitable communication circuitry 7 to transmit such data to a remote processor/server via, for example, an external mobile network.

The control unit 4 may be configured to receive the measurement signal from each of the plurality of sensors 2, and then time-shift the received measurement signals based on the velocity of the rail-bound vehicle 10 and the defined distances d1, d2, and d3 to form a modified set of signals, such that the measurement made by each sensor 2 at the same geographical location appears to have occurred simultaneously. The modified set of vibration signals may be a modified set of vibration detection signals if the sensors 2 are accelerometers, or light detection signals if the sensors are light sensors.

The control unit may be further configured to determine whether an event measured by the plurality of sensors is present at the same point in time in at least two signals of the modified set of signals. If so, it may be concluded that the detected event is true, and not a false positive. Optionally, the control unit 4 may be configured to determine whether an event measured by the plurality of sensors is present at the same point in time in a majority of signals of the modified set of signals, and to determine whether an event measured by the plurality of sensors is present at the same point in time in all signals of the modified set of signals.

The sensor system 1 may further include a geolocation system 6 (e.g. a GNSS such as GPS, Galileo, GLONASS, BeiDou, et cetera) for determining the geographical position (longitude, latitude, and elevation) of the rail-bound vehicle 10. Accordingly, the control unit 2 may be further configured to receive the geographical position of the rail-bound vehicle 10 from the geolocation system 6, and determine a geographical location of the previously determined event.

The rail-bound vehicle 10 may further include a lighting device arranged in each carriage 11 which may include a light sensor 2 and/or an air pressure sensor. Each lighting device is operatively connected to the control unit 4. In other words, the control unit 4 may control the operation of each lighting device. More specifically, the control unit 4 is configured to control each lighting device (dim up, dim down, turn on, turn off, et cetera) based on the modified set of light detection signals and/or the modified set of air pressure detection signals. This may be advantageous to increase precision of dimming up/down in carriages when the rail-bound vehicle 10 enters or exists a tunnel.

Figure 2:
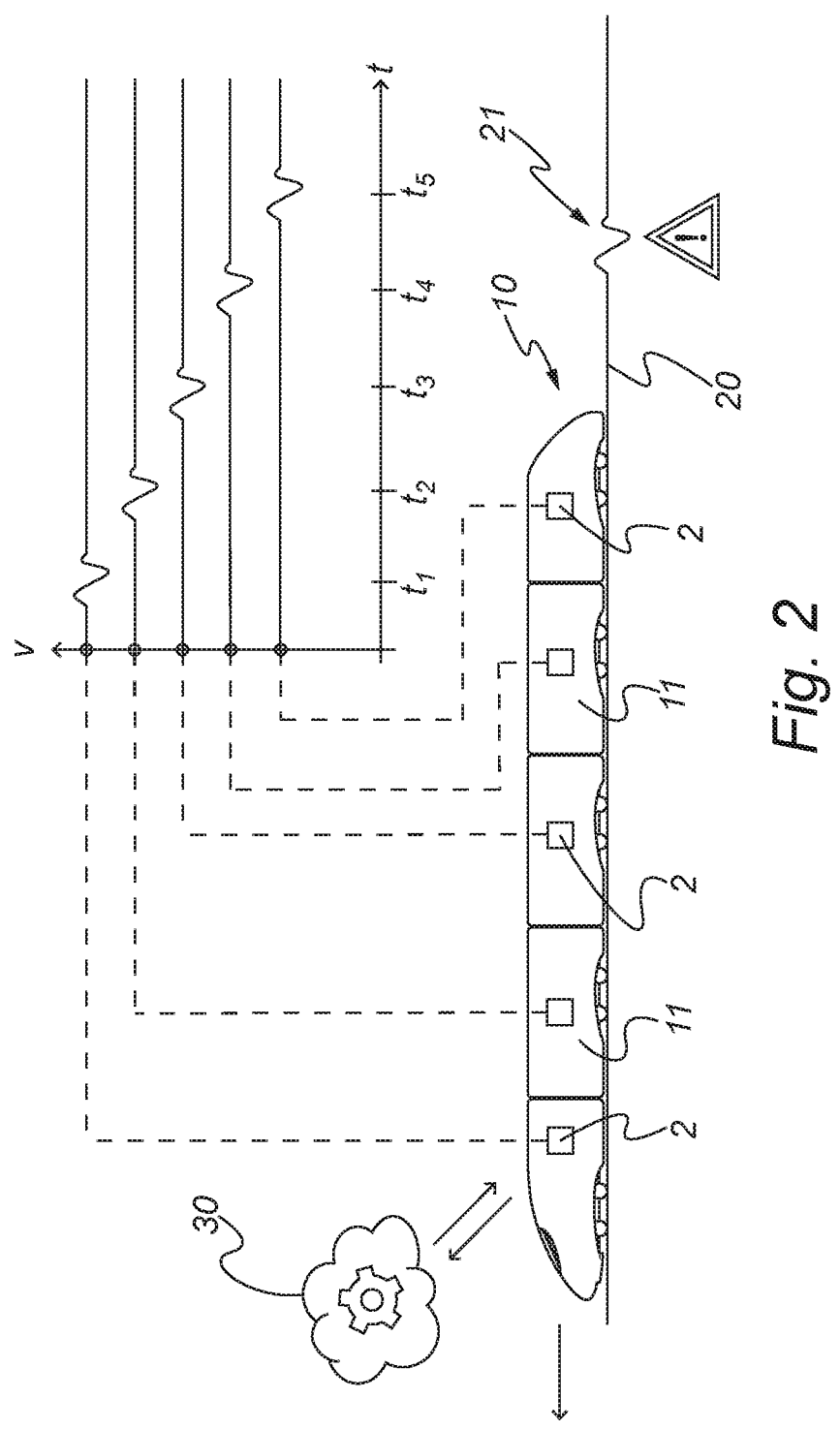
FIG. 2 is a schematic illustration of a rail-bound vehicle having a sensor system according to another embodiment of the disclosure.

FIG. 2 is a schematic illustration of a rail-bound vehicle having a sensor system according to another embodiment of the disclosure. The rail-bound vehicle of FIG. 2 differs from the one in FIG. 1 in that the control unit may be arranged as a remote (central) control unit 30, instead of a local control unit (reference number 4 in FIG. 1). As previously mentioned, it may be advantageous to use a remote-control unit 30 to retrieve sensor data from a plurality of rail-bound vehicles to even further increase the accuracy and reliability of the system. For example, the control unit 30 may be configured to allow a plurality of rail-bound vehicles 10 to travel along the same section of a rail-way track 20 and process the data from each rail-bound vehicle 10 before any final decision regarding the rail-way track condition is taken. Other features and specific details in FIG. 2 may be similar to or different from those described with reference to FIG. 1.

Moving on regarding FIG. 2, the sensor system may include a plurality of sensors 2 with each sensor being in a separate carriage 11 of the rail-bound vehicle. Each sensor 2 may be further arranged at a defined distance from a reference point within the rail-bound vehicle 10 and configured to generate a measurement signal (as indicated in the chart in FIG. 2) based on a detection of an environmental parameter. In addition, the sensors 2 here may be in the form of accelerometers 2. As the rail-bound vehicle 10 passes over a locally damaged track 21, the raw readings from the accelerometers may be illustrated in the V-t chart in FIG. 2.

Figure 3:
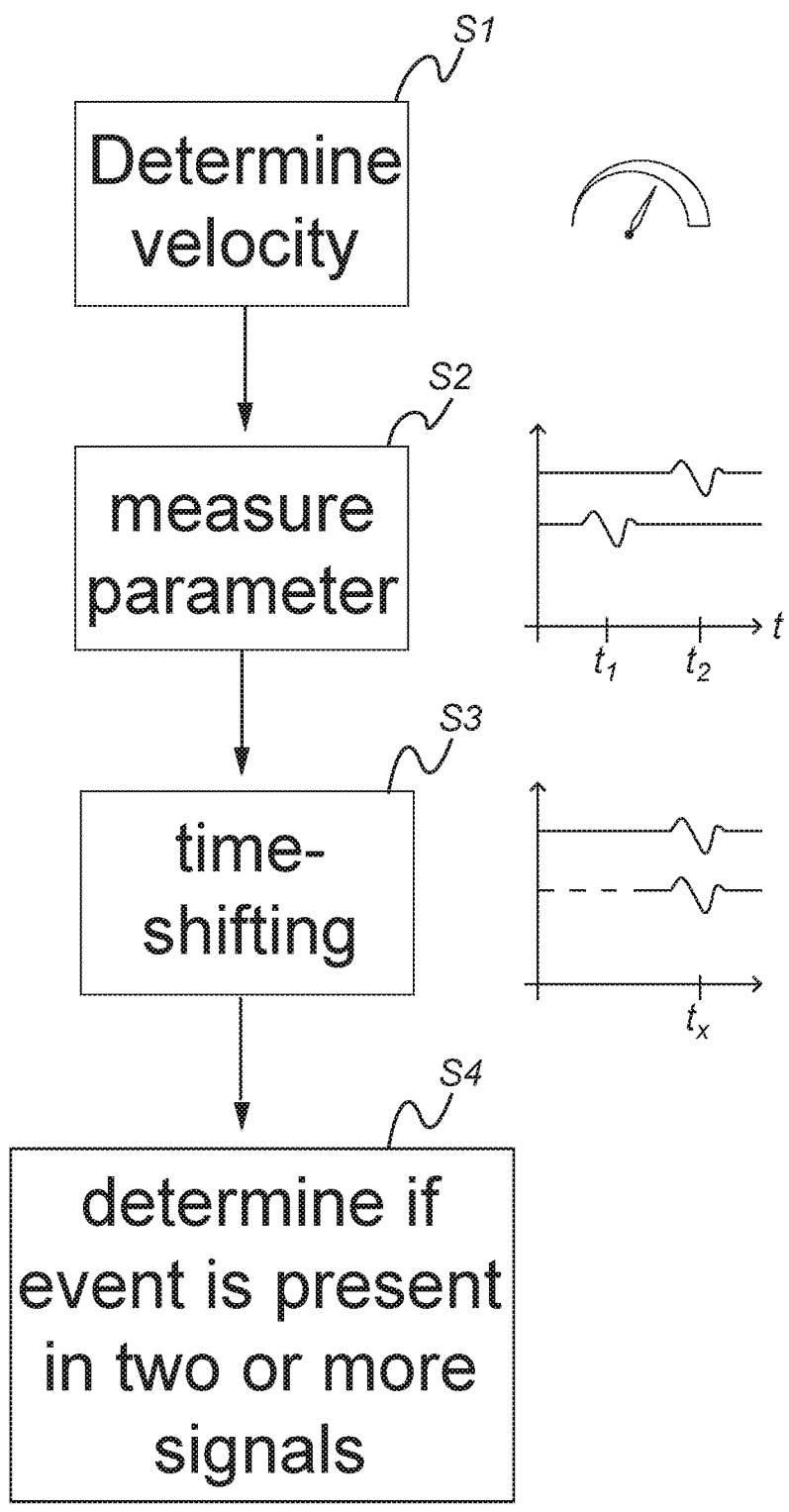
FIG. 3 is a flow-chart illustrating a method for measuring environmental parameters associated with a rail-bound vehicle having a plurality of carriages according to an embodiment of the disclosure.

Accordingly, the control 30 may be configured to receive such measurement signals, and time-shift the received signals based on the velocity of the rail-bound vehicle 10 and the defined distances to form a modified set of signals (see e.g., the V-t chart next to box S3 in FIG. 3). Next, the control unit 30 may be configured to determine whether an event 21, measured by the plurality of accelerometers 2 is presented at the same point in time in at least two signals of the modified set of signals, in a majority of the signals in the modified set of signals, or in all signals of the modified set of signals.

FIG. 3 is a flow-chart illustrating a method for measuring environmental parameters associated with a rail-bound vehicle having a plurality of carriages according to an embodiment of the disclosure. The method may include the steps of S1 determining a velocity of the rail-bound vehicle; and S2 measuring an environmental parameter (e.g. vibration, sound, et cetera) independently in each carriage of the plurality of carriages, thereby forming a plurality of measurement readings over time. Each measurement may be performed at a defined distance from a reference point within the rail-bound vehicle. In other words, the distance between every measurement point may be defined. In the example shown in FIG. 3, only two measurement readings are indicated, where an event was registered at time t1 for the first sensor and at time t2 for the second sensor.

Further, the method may include a step S3 of time-shifting the measurement readings based on the determined velocity and the defined distances. Hereby, a modified set of measurement readings is formed, such that a measurement made in each carriage at the same geographical location appears to have occurred simultaneously. In more detail, in the illustrated example, the signal of the first sensor is time-shifted by the quotient of the distance between the two sensors over the velocity of the rail-bound vehicle.

The method may further include a step of determining S4 whether an event measured in each separate carriage is present at the same point in time in at least two readings of the modified set of measurement readings, in a majority of the readings of the modified set of measurement readings, or in all of the readings of the modified set of readings. If this condition is true (an event is present at the same point in time for at least two of the readings), then it may be concluded that the measurements are correct and not a false positive.

Various methods and systems have now been described in the above embodiments. However, other variations of the sensor system may also be feasible. For example, the system may include a specific type of sensor or a combination of different types of sensors. Further, the time-shifting may be based on a distance between the different sensors, or between each sensor and a reference point depending on application needs. Such and other modifications must be considered to be within the scope of the disclosure, limited only by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "including" does not exclude the presence of other elements or steps than those listed in the claim. The word "a" or "an" preceding an element does not exclude the presence of a plurality of such elements.

Various embodiments of the disclosure may have one or more of the following effects. Some embodiments of the disclosure may provide methods and sensor systems for rail-bound vehicles, in particular trains, which may help to alleviate all or at least some of the drawbacks of presently known systems. Other embodiments of the disclosure may provide sensor systems and methods for rail-bound vehicles which enable reliable and cost-effective monitoring and diagnosing of the condition of a railway track.

In some embodiments, the disclosure may provide a sensory system for a rail-bound vehicle having a plurality of carriages. The system may include a plurality of sensors, with each sensor being arranged in a separate carriage of the rail-bound vehicle at a defined distance from a reference point within the rail-bound vehicle, and each sensor being configured to generate a measurement signal based on detection of an environmental parameter; a velocity measurement device configured to determine a velocity of the rail-bound vehicle; and a control unit configured to receive the measurement signal from each of the plurality of sensors, time-shift the received measurement signals based on the velocity of the rail-bound vehicle and the defined distance to form a modified set of signals, such that a measurement made by each sensor at the same geographical location appears to have occurred simultaneously, and determine whether an event measured by the plurality of sensors is present at the same point in time in at least two signals of the modified set of signals, in a majority of signals of the modified set of signals, or in all signals of the modified set of signals.

The provided systems may increase redundancy for various applications for rail-bound vehicles in a simple and cost-effective manner. For example, the inventive method may be utilized for increasing redundancy and thereby reliability of rail malfunction detection, internal environment settings (e.g. dimming of lighting arrangements), and geographical positioning of the vehicle. In other words, the disclosure may synthesize a higher-quality recording of geographically localized phenomena by using information about the instantaneous velocity of the train to combine the data from several sensors of the same type installed in multiple places throughout the length of the train.

The control unit may be provided by means of appropriate software, hardware, or a combination thereof. Moreover, the control unit may be a local controller arranged or provided within the rail-bound vehicle. Alternatively, the control unit may be a central control unit, arranged remotely in reference to the rail-bound vehicle. It may be advantageous to utilize a centralized system with a central control unit for the sake of computational capability. In yet another alternative embodiment, the system may use a combination of a local control unit and a central control unit, in which the local control unit may be configured to transmit sensor data to the central control unit by means of a router via, for example, an exterior mobile network.

Suitable sensors may, for example, be electrical transducers which may convert physical quantities into electrical quantities, such as accelerometers, optical sensors, acoustic sensors, pressure sensors, et cetera, depending on the intended application.

In the context of the disclosure, the step of time-shifting the received measurement signals should be understood to mean that not all of the received signals necessarily need to be shifted. For example, it may be sufficient to apply a time-shift to all but one signal if that signal originates from a sensor which acts as the spatial reference point, such that the modified set of signals is formed. However, in other embodiments, all of the signals may be time-shifted to form the modified set of signals.

The disclosed systems may be based on the notion that the inherent multi-carriage arrangement on rail-bound vehicles such as trains or trams may be used to implement a simple, reliable, and cost-effective monitoring system suitable for various applications. In reference to a track monitoring application, by having a set of sensors each arranged in a separate carriage at a known distance from each other, one may utilize the individual measurements by each sensor to make a reliable determination of a damaged section of a railway track without using expensive sensing arrangements, utilizing specialized vehicles, dispatching personnel, or making multiple measurements by multiple vehicles.

In other words, one may implement a reliable and cost-effective system by having the distance between each sensor known (directly or indirectly), and time-shifting the recorded values from each sensor in proportion to the velocity of the train (as measured by e.g. GPS, wheel tick counter, or any other suitable means) and the aforementioned distance, such that the data appears to have been recorded by sensors located at a single location on the rail-bound vehicle (though the sensors may be spread out along the length of the rail-bound vehicle).

The disclosed system may utilize relatively inexpensive sensors. Yet by aggregating the sensor data, the disclosed system may provide reliable and precise measurement data, thus making it feasible to provide the sensor system on many trains or other vehicles travelling on any particular part of a railway system. As a result, every part of the railway system may be measured and monitored with high frequency to a very low cost. Accordingly, problems related to the railway system, such as emerging problems related to wear on the railway tracks, switches and the like, may be detected at an early stage, before any serious malfunction and accidents have occurred, which may help maintenance and the like to be scheduled more efficiently.

To this end, it may be feasible to compare newly acquired sensor data with previously acquired sensor data from the same vehicle, or from other vehicles having passed the same location, and to determine trends, et cetera.

Further, each sensor may be arranged in the same or similar position in each carriage, such that the structural surroundings are the same or similar. Thus, the need for individual calibration of each sensor may be reduced. However, as is readily appreciated by a skilled reader, each sensor may be placed at locations with differing structural surroundings. Reliable data may be extracted by appropriate filtering algorithms or calibration schemes.

In other embodiments, the plurality of sensors may include a plurality of accelerometers. Each accelerometer may be arranged in a separate carriage of the rail-bound vehicle at a defined distance from the reference point within the rail-bound vehicle, and each accelerometer may be configured to generate a vibration detection signal based on a detection of vibration of an associated carriage. The control unit may be configured to receive the vibration detection signal from each of the plurality of accelerometers; time-shift the received vibration detection signals based on the velocity of the rail-bound vehicle and the defined distance between the accelerometers and the reference point to form a modified set of vibration detection signals, such that a measurement made by each accelerometer at the same geographical location appears to have occurred simultaneously; and determine whether an event measured by the plurality of accelerometers is present at the same point in time in at least two of the modified set of vibration detection signals, preferably in a majority of the modified set of vibration detection signals, or more preferably in all of the modified set of vibration detection signals.

Accordingly, the sensor system may be utilized for monitoring track quality on a railway, and thereby enable for detection of developing mechanical issues before a breakdown occurs. It may be the case that the data generated by conventional accelerometers for representing mechanical issues on a railway may be of lower quality than that recorded by the specialized track geometry vehicles discussed in the background section of the present application. However, the abundance of data resulting from equipping multiple carriages with accelerometers may compensate for the lower quality, especially when statistical analysis and correlation is performed on these large data sets. Measuring a vibration may be understood as accelerations along a substantially vertical axis.

In further embodiments, the plurality of sensors may further include a plurality of acoustic sensors. Each acoustic sensor may be arranged in a separate carriage of the rail-bound vehicle at a defined distance from the reference point within the rail-bound vehicle, and each acoustic sensor may be configured to generate a sound detection signal based on sound measurements in an associated carriage. The control unit may be further configured to receive the sound detection signal from each of the plurality of acoustic sensors; time-shift the received sound detection signals based on the velocity of the rail-bound vehicle and the defined distance between the acoustic sensors and the reference point to form a modified set of sound detection signals, such that a measurement made by each acoustic sensor at the same geographical location appears to have occurred simultaneously; and determine whether an event measured by the plurality of acoustic sensors is present at the same point in time in at least two of the modified set of sound detection signals, in a majority of the modified set of sound detection signals, or in all of the modified set of sound detection signals.

Accordingly, by applying the same velocity based time-shift to sound level readings, it is possible to detect noise caused by a geographically fixed object, such as e.g. tree branches or man-made structures, brushing or scraping against the vehicle along the railway track. These readings may, for example, be used to increase redundancy in the above discussed accelerometer data to filter false positives in the accelerometer data (e.g. to detect vibrations caused by other objects than mechanical damages on the railway track).

Further, in yet another exemplary embodiment of the disclosure, the plurality of sensors may further include a plurality of light sensors, each light sensor being arranged in a separate carriage of the rail-bound vehicle at a defined distance from the reference point within the rail-bound vehicle, and each light sensor being configured to generate a light detection signal based on light measurements in an associated carriage. The control unit may be further configured to receive the light detection signal from each of the plurality of light sensors; time-shift the received light detection signals based on the velocity of the rail-bound vehicle and the defined distance between the light sensors and the reference point to form a modified set of light detection signals, such that a measurement made by each light sensor at the same geographical location appears to have occurred simultaneously; and determine whether an event measured by the plurality of light sensors is present at the same point in time in at least two of the modified set of light detection signals, preferably in a majority of the modified set of light detection signals, or more preferably in all of the modified set of light detection signals.

By using the time-shifted light detection signals, it may be possible to detect the entering or leaving of a tunnel in a simple and cost-effective manner. Such information (modified set of light detection signals) may, for example, be used to control the dimming up and down of lighting in the carriages, or for the augmentation of positioning systems (e.g. geolocation systems such as GPS), as will be further elaborated upon in the following. Alternately, air pressure sensors may be used for similar purposes.

In some embodiments, the plurality of sensors may further include a plurality of air pressure sensors. Each air pressure sensor may be arranged in a separate carriage of the rail-bound vehicle at a defined distance from the reference point within the rail-bound vehicle, and each air pressure sensor may be configured to generate an air pressure detection signal based on air pressure measurements in an associated carriage. The control unit may be further configured to receive the air pressure detection signal from each of the plurality of air pressure sensors; time-shift the received air pressure detection signals based on the velocity of the rail-bound vehicle and the defined distance between the air pressure sensors and the reference point to form a modified set of air pressure detection signal, such that a measurement made by each air pressure sensor at the same geographical location appears to have occurred simultaneously; and determine whether an event measured by the plurality of air pressure sensors is present at the same point in time in at least two of the modified set of air pressure detection signals, preferably in a majority of the modified set of air pressure detection signals, or more preferably in all of the modified set of air pressure detection signals.

Optionally, the sensor system may further include a geolocation system arranged in the rail-bound vehicle for determining a geographical position of the rail-bound vehicle. The control unit may be configured to receive the geographical position from the geolocation system and determine a geographical location of the determined event based on the received geographical position. The geolocation system may be a GNSS (Global Navigation Satellite System) such as e.g. GPS, GLONASS, GALILEO, BeiDou, et cetera. However, other geolocation systems (e.g., radio beacons, simultaneous localization and mapping (SLAM), et cetera) may also be implemented.

Optionally, the control unit may be further configured to correlate the modified set of light detection signals and/or the modified set of air pressure detection signals with the determined geographical position to add redundancy to measurements performed by the geolocation system.

In other words, one may utilize some embodiments of the inventive sensor system which may include the light sensors and/or the air pressure sensors and correlate their readings with the positional readings of the geolocation system. For example, by using the light sensors to determine when the rail-bound vehicle passes enters or exists a tunnel, this information may be compared to the position as determined by the geolocation system to provide a more reliable geographical position determining means.

In other embodiments, the sensor system may further include a lighting device arranged in each carriage which may include a light sensor and/or an air pressure sensor. Each lighting device may be operatively connected to the control unit. The control unit may be further configured to control each lighting device based on the modified set of light detection signals and/or the modified set of air pressure detection signals. By relying on the modified set of light detection signals and/or the modified set of air pressure signals, the probability that a light detection event and/or the air pressure event has occurred may be increased, and thereby the risk of inappropriate light dimming in vehicle carriages, due to false positives or false negatives, may be reduced.

In further embodiments, methods for measuring environmental parameters associated with a rail-bound vehicle having a plurality of carriages may include the following steps. Determining a velocity of the rail-bound vehicle. Measuring an environmental parameter independently in a plurality of carriages thereby forming a measurement reading over time, each measurement being performed at a defined distance from a reference point within the rail-bound vehicle. Time-shifting the measurement readings based on the velocity of the rail-bound vehicle and the defined distance, to form a modified set of measurement readings, such that a measurement made in each carriage at the same geographical location appears to have occurred simultaneously. Determining whether an event measured in each separate carriage is present at the same point in time in at least two of the modified set of measurement readings, preferably in a majority of the modified set of measurement readings, or more preferably in all of the modified set of measurement readings.

With this aspect of the embodiments of the disclosure, similar or different advantages and preferred features may be present as in the previously discussed first aspect of the invention and vice versa. For example, the environmental parameter may be vibration, sound, light, or air pressure. In reference to the vibration measurement, this may refer to detectable vibrations which may be larger in magnitude than the normal vibrations caused by the normal vehicle movements (for example, when the rail-bound vehicle passes over a damaged section of the railway track).

Many different arrangements of the various components depicted, as well as components not shown, are possible without departing from the spirit and scope of the present disclosure. Embodiments of the disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A sensor system comprising:
a rail-bound vehicle having a plurality of carriages;
a plurality of sensors comprising a plurality of accelerometers, each accelerometer being arranged in a separate carriage of said rail-bound vehicle at a defined distance from a reference point within said rail-bound vehicle, and each accelerometer being configured to generate a vibration measurement signal based on detection of a vibration of an associated carriage, the vibration measurement signal being related to accelerations along a substantially vertical axis;
a velocity measurement device configured to determine a velocity of said rail-bound vehicle;
a control unit configured to:
   receive the vibration measurement signal from each of said plurality of accelerometers;
   time-shifting the received vibration measurement signals based on said velocity of the rail-bound vehicle and said defined distance between the accelerometers and said reference point by obtaining a quotient of said defined distance over the velocity of the rail-bound vehicle in order to form a modified set of vibration signals, such that a vibration measurement made by each accelerometer at the same geographical location appears to have occurred simultaneously;
determine whether an event measured by said plurality of accelerometers is present at the same point in time in at least two signals of said modified set of vibration signals-; and
   determine, based on the determination of such an event, the presence of a damaged section of the railway track.

2. The sensor system according to claim 1, wherein said plurality of sensors further comprises a plurality of acoustic sensors, each acoustic sensor being arranged separate carriage of said rail-bound vehicle at a defined distance from the reference point within said rail-bound vehicle, and each acoustic sensor being configured to generate a sound detection signal based on sound measurements in an associated carriage;
wherein said control unit is further configured to:
   receive the sound detection signal from each of said plurality of acoustic sensors;

time-shifting the received sound detection signals based on said velocity of the rail-bound vehicle and said defined distance between the acoustic sensors and said reference point in order to form a modified set of sound detection signals, such that a measurement made by each acoustic sensor at the same geographical location appears to have occurred simultaneously; and determine whether an event measured by said plurality of acoustic sensors is present at the same point in time in at least two signals of said modified set of sound detection signals.

3. The sensor system according to claim 1, wherein said plurality of sensors further comprises a plurality of light sensors, each light sensor being arranged separate carriage of said rail-bound vehicle at a defined distance from the reference point within said rail-bound vehicle, and each light sensor being configured to generate a light detection signal based on light measurements in an associated carriage;

wherein said control unit is further configured to:

receive the light detection signal from each of said plurality of light sensors;

time-shifting the received light detection signals based on said velocity of the rail-bound vehicle and said defined distance between the light sensors and said reference point in order to form a modified set of light detection signals, such that a measurement made by each light sensor at the same geographical location appears to have occurred simultaneously; and determine whether an event measured by said plurality of light sensors is present at the same point in time in at least two signals of said modified set of light detection signals.

4. The sensor system according to claim 3, further comprising:

a geolocation system arranged in said rail-bound vehicle for determining a geographical position of said rail-bound vehicle; and wherein said control unit is configured to receive said geographical position from said geolocation system and determine a geographical location of said determined event based on said received geographical position.

5. The sensor system according to claim 4, wherein said control unit is configured to correlate said modified set of light detection signals with said determined geographical position in order to add redundancy to measurements performed by said geolocation system.

6. The sensor system according to claim 3, further comprising:

a lighting device arranged in each carriage which comprises a light sensor, each lighting device being operatively connected to said control unit; and wherein said control unit is further configured to:

control each lighting device based on said modified set of light detection signals.

7. The sensor system according to claim 1, wherein said plurality of sensors further comprises a plurality of air pressure sensors, each air pressure sensor being arranged separate carriage of said rail-bound vehicle at a defined distance from the reference point within said rail-bound vehicle, and each air pressure sensor being configured to generate an air pressure detection signal based on air pressure measurements in an associated carriage;

wherein said control unit is further configured to:

receive the air pressure detection signal from each of said plurality of air pressure sensors;

time-shifting the received air pressure detection signals based on said velocity of the rail-bound vehicle and said defined distance between the air pressure sensors and said reference point in order to form a modified set of air pressure detection signals, such that a measurement made by each air pressure sensor at the same geographical location appears to have occurred simultaneously; and determine whether an event measured by said plurality of air pressure sensors is present at the same point in time in at least two signals of said modified set of air pressure detection signals.

8. The sensor system according to claim 7, further comprising:

a geolocation system arranged in said rail-bound vehicle for determining a geographical position of said rail-bound vehicle; and wherein said control unit is configured to receive said geographical position from said geolocation system and determine a geographical location of said determined event based on said received geographical position.

9. The sensor system according to claim 8, wherein said control unit is further configured to correlate said modified set of air pressure detection signals with said determined geographical position in order to add redundancy to measurements performed by said geolocation system.

10. The sensor system according to claim 7, further comprising:

a lighting device arranged in each carriage which comprises a light sensor and/or an air pressure sensor, each lighting device being operatively connected to said control unit; and wherein said control unit is further configured to:

control each lighting device based on said modified set of air pressure detection signals.

11. The sensor system according to claim 3, wherein said plurality of sensors further comprises a plurality of air pressure sensors, each air pressure sensor being arranged separate carriage of said rail-bound vehicle at a defined distance from the reference point within said rail-bound vehicle, and each air pressure sensor being configured to generate an air pressure detection signal based on air pressure measurements in an associated carriage;

wherein said control unit is further configured to:

receive the air pressure detection signal from each of said plurality of air pressure sensors;

time-shift the received air pressure detection signals based on said velocity of the rail-bound vehicle and said defined distance between the air pressure sensors and said reference point in order to form a modified set of air pressure detection signals, such that a measurement made by each air pressure sensor at the same geographical location appears to have occurred simultaneously; and determine whether an event measured by said plurality of air pressure sensors is present at the same point in time in at least two signals of said modified set of air pressure detection signals.

12. The sensor system according to claim 11, further comprising:

a lighting device arranged in each carriage which comprises a light sensor, each lighting device being operatively connected to said control unit; and wherein said control unit is further configured to:

control each lighting device based on said modified set of light detection signals and/or said modified set of air pressure detection signals.

13. The sensor system according to claim 2, wherein the control unit is further arranged to use the events determined from the modified set of sound detection signals to filter the events determined from the modified set of vibration signals.

14. The sensor system according to claim 1, wherein each accelerometer is arranged in the same or similar position in each carriage, thereby providing the same structural surroundings for the accelerometers.

15. The sensor system according to claim 1, wherein the control unit is further configured to compare the modified set of vibration signals to previously acquired modified sets of vibration signals, acquired at the same location, and to determine a trend for the newly modified sets of vibration signals in relation to the previously acquired modified set of vibration signals.

16. A sensor system comprising:

a rail-bound vehicle having a plurality of carriages;

a plurality of sensors comprising a plurality of accelerometers and a plurality of acoustic sensors, all accelerometers and all acoustic sensors, respectively, being arranged in separate carriages of said rail-bound vehicle at defined distances from a reference point within said rail-bound vehicle, each accelerometer being configured to generate a vibration measurement signal based on detection of a vibration of an associated carriage and each acoustic sensor being configured to generate a sound detection signal based on sound measurements in an associated carriage;

a velocity measurement device configured to determine a velocity of said rail-bound vehicle;

a control unit configured to:

receive the vibration measurement signal from each of said plurality of accelerometers and the sound detection signal from each of said plurality of acoustic sensors;

time-shifting the received vibration measurement signals and the received sound detection signals based on said velocity of the rail-bound vehicle and said defined distance between the accelerometers an acoustic sensors and said reference point respectively by obtaining a quotient of said defined distances over the velocity of the rail-bound vehicle in order to form modified sets of vibration signals and sound detection signals, such that a vibration measurement made by each accelerometer and a sound measurement made by each acoustic sensors at the same geographical locations appears to have occurred simultaneously; and determine whether an event measured by said plurality of accelerometers is present at the same point in time in at least two signals of said modified set of vibration signals and an event measured by said plurality of acoustic sensors is present at the same point in time in at least two signals of said modified set of sound detection signals-; and determine, based on the determination of such an event, the presence of a damaged section of the railway track.

17. The sensor system according to claim 16, wherein the control unit is further arranged to use the events determined from the modified set of sound detection signals to filter the events determined from the modified set of vibration signals.

* * * * *